(12) United States Patent
Li et al.

(10) Patent No.: US 9,195,892 B2
(45) Date of Patent: Nov. 24, 2015

(54) SYSTEM FOR AND METHOD OF DETECTING STROBE USING SPATIAL FEATURES IN VIDEO FRAMES

(71) Applicant: General Instrument Corporation, Horsham, PA (US)

(72) Inventors: Renxiang Li, Lake Zurich, IL (US); Faisal Ishtiaq, Chicago, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 13/858,921

(22) Filed: Apr. 8, 2013

(65) Prior Publication Data

US 2014/0270503 A1  Sep. 18, 2014

Related U.S. Application Data

(60) Provisional application No. 61/799,839, filed on Mar. 15, 2013.

(51) Int. Cl.
  *G06K 9/00* (2006.01)
  *G06K 9/46* (2006.01)

(52) U.S. Cl.
  CPC ........ *G06K 9/00744* (2013.01); *G06K 9/00711* (2013.01); *G06K 9/4647* (2013.01)

(58) Field of Classification Search
  None
  See application file for complete search history.

(56) References Cited

U.S. PATENT DOCUMENTS

| 5,828,378 A | 10/1998 | Shiraishi |
| 7,095,451 B2 | 8/2006 | Kitazawa et al. |
| 7,880,815 B2 | 2/2011 | Yeh et al. |
| 7,953,286 B2 * | 5/2011 | Chiang et al. ................. 382/254 |
| 8,139,157 B2 | 3/2012 | Someya et al. |
| 8,503,520 B2 * | 8/2013 | Chen et al. ..................... 375/240 |
| 2003/0123726 A1 * | 7/2003 | Suh ............................... 382/170 |

(Continued)

FOREIGN PATENT DOCUMENTS

| EP | 2056587 A1 | 5/2009 |
| EP | 1048169 B1 | 5/2010 |

(Continued)

OTHER PUBLICATIONS

Zhang, D., et al., "A New Shot Boundary Detection Algorithm", Microsoft China Research, 2001.

(Continued)

*Primary Examiner* — Bhavesh Mehta
*Assistant Examiner* — Feng Niu
(74) *Attorney, Agent, or Firm* — Stewart M. Wiener

(57) ABSTRACT

A video processing device includes a histogram generating component, an analyzing component, a comparator and an encoding component. The histogram generating component can generate a histogram for image data of an image frame. The analyzing component can analyze the histogram, can identify an isolated spike in the histogram and can output at least one strobe parameter. The comparator can compare the at least one strobe parameter with at least one predetermined threshold, can output a first instruction signal when the at least one comparison operation is indicative of a strobe and can output a second instruction signal when the at least one comparison operation is not indicative of a strobe. The encoding component can encode the image data in a first manner based on the first instruction signal and can encode the image data in a second manner based on the second instruction signal.

9 Claims, 15 Drawing Sheets

(56) References Cited

U.S. PATENT DOCUMENTS

| | | |
|---|---|---|
| 2004/0008284 A1* | 1/2004 | Kim .............................. 348/699 |
| 2006/0152634 A1 | 7/2006 | Yeh et al. |
| 2008/0037897 A1* | 2/2008 | Chiang et al. ................. 382/273 |
| 2009/0147142 A1* | 6/2009 | Wang ............................ 348/663 |
| 2010/0284612 A1 | 11/2010 | Peters |
| 2012/0242864 A1 | 9/2012 | Pauli et al. |

FOREIGN PATENT DOCUMENTS

| | | |
|---|---|---|
| EP | 2187647 A1 | 5/2010 |
| EP | 2421249 A1 | 2/2012 |
| EP | 2426620 A1 | 3/2012 |
| WO | 9933261 A1 | 7/1999 |
| WO | 2009075845 A1 | 6/2009 |
| WO | 2009090586 A1 | 7/2009 |

OTHER PUBLICATIONS

Guimaraes, S., et al., "Video segmentation based on 2D image analysis", Pattern Recognition Letters 24, 2003, pp. 947-957.

Ekiza, C., et al., "Use of Morphological Filters in Detection of Flashes and Other Light Events in Video Sequences", Nov. 19, 2011.

PCT Search Report & Written Opinion, RE: Application #PCT/US2014/025376; dated Jun. 25, 2014.

N. Benjama, et al., "Flashlight Detection in Indoor Sport Videos for Highlight Generation", ECTI-CON 2005, 2nd International Conference on Electrical Engineering/Electronics, Computer, Telecommunications and Information Technology, Jan. 1, 2005, pp. 534-537.

* cited by examiner

SYSTEM FOR AND METHOD OF DETECTING STROBE USING SPATIAL FEATURES IN VIDEO FRAMES

RELATED CASES

The present application claims priority from U.S. Provisional Application No. 61/799,839, filed Mar. 15, 2015, the entire disclosure of which is incorporated herein by reference.

BACKGROUND

The present disclosure relates to a system for and method of detecting a strobe in an image frame of a video.

BRIEF SUMMARY OF THE DRAWINGS

The accompanying drawings, which are incorporated in and form a part of the specification, illustrate example embodiments and, together with the description, serve to explain the principles thereof. In the drawings.

DETAILED DESCRIPTION

The present disclosure is generally drawn to systems and methods of detecting a strobe within an image. Strobes are commonly produced in video. As a cinematic feature, it is often used to signal emotions or as a separator for the transition from one shot to another. Sometimes, strobes are due to physical reasons, such as the video source directly facing a directional light source. The strobe typically includes an extremely bright core, surrounded by transition strip with the strength of the brightness gradually degrades away from the core and eventually blends into the background.

Detecting and identifying a strobe within an image frame may be useful for many reasons. For example, image frames having strobes therein may need different encoding. Therefore, if a strobe can be recognized, appropriate encoding resources may be allocated. For purposes of discussion therein, identification of a strobe within an image will be discussed in conjunction with encoding. However, it should be noted that such discussion is merely for purposes of explanation, and is not to be limited.

Figure 1:
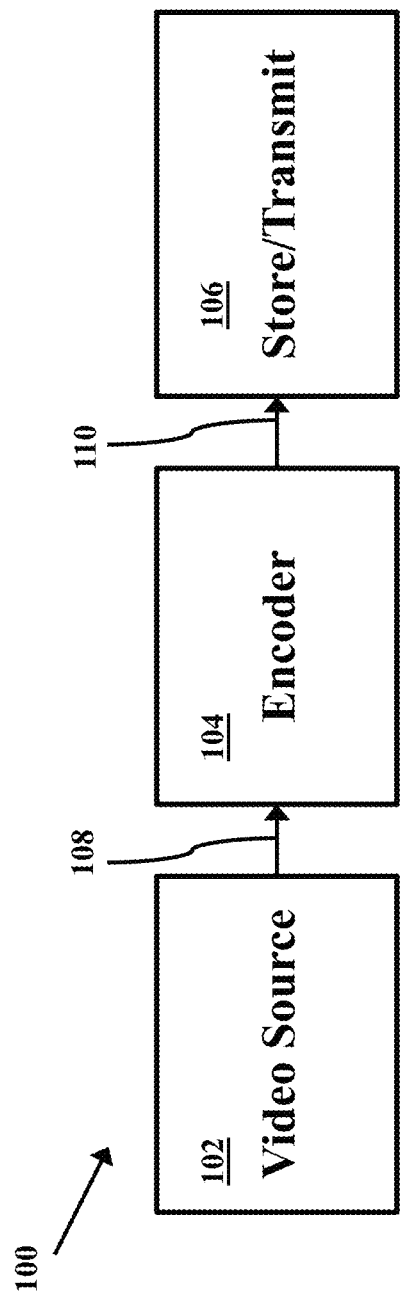
FIG. 1 illustrates a conventional video system.

FIG. 1 illustrates a conventional video system 100. As shown in figure, conventional video system 100 includes a video source 102, an encoder 104 and a storage/transmission component 106. Non limiting examples of video source 102 include a media server, a camera, a video storage, a receiver and a video decoder (in the context of transcoding, where input video is first decoded and re-encoded into different size, format, etc).

Video source 102 is operable to provide image data 108 to encoder 104. Encoder 104 is operable to provide encoded data 110 to storage/transmission component 106.

In operation, video source 102 generates image data 108 as a series of still images, wherein each still image is called a frame. Each frame is composed of a plurality of pixels, wherein each pixel includes pixel data. Pixel data for each pixel includes at least one characteristic and an associated value of the characteristic(s) of that pixel. Non-limiting examples of characteristics include chrominance, luminance, etc. The associated value of the characteristic may be a detected value in a predetermined range. For example pixel data may include as a characteristic, the amount of detected red in the pixel, whereas the associated value is on a scale from 0 to 255, wherein zero is an indication that no red has been detected and 255 is an indication of a maximum amount of red has been detected. Similarly, in another example, pixel data may include as a characteristic, the amount of detected luminance in the pixel, whereas the associated value is on a scale of 0 to 255, wherein zero is an indication of no detected luminance and 255 is an indication of maximum luminance Examples of pixel data associated with image frames may now be described with reference to FIG. 2.

Figure 2:
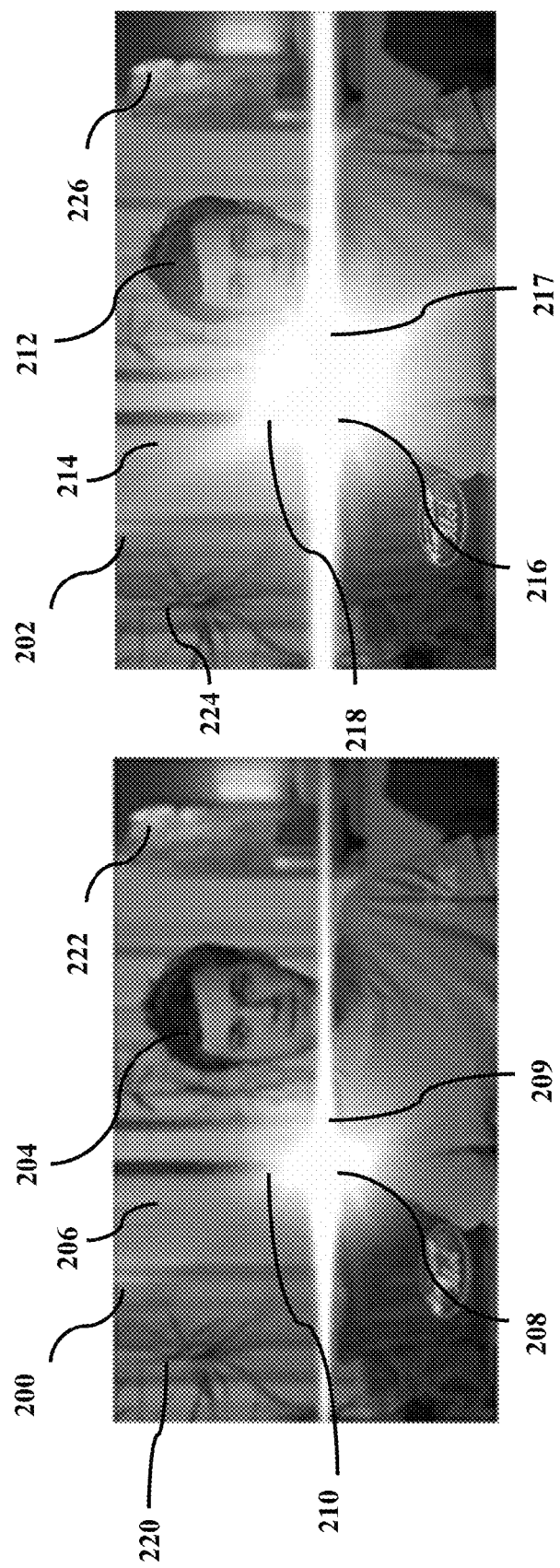
FIG. 2 illustrates two image frames.

FIG. 2 illustrates an image frame 200 and an image frame 202.

Image frame 200 includes an image of a person 204, a background 206 and a strobe 209. Image frame 202 includes a second image of a person 212, a background 214 and the strobe 217.

In image frame 200, strobe 209 is clearly illustrated as a bright core 208 surrounded by a transition 210, whose brightness gradually degrades away from core 208 to background 206. Similarly, in image frame 202, strobe 217 is clearly illustrated as a bright core 216 surrounded by a transition 218, whose brightness gradually degrades away from core 216 to background 214.

It may be useful to be able to identify a strobe within a frame. As mentioned earlier for example, for purposes of encoding, additional encoding resources may be needed to encode a frame having a strobe. In particular, some encoding techniques rely on comparisons of adjacent frames to reduce the amount of data needed to describe a frame. In such encoding techniques, when there are large differences between adjacent frames, more data is required to encode such adjacent frames.

With this in mind, returning to FIG. 2, comparing image frame 200 with image frame 202, strobe 209 may generally be considered to be of similar brightness and location as strobe 217. However the size of strobe 209 is much smaller than strobe 217. Further, transition 210 of strobe 209 is much smaller than transition 218 of strobe 217. Accordingly, the different strobes may require additional processing resources for encoding. For at least this reason, it may be important to identify a strobe frame.

Returning to FIG. 1, encoder 104 encodes image data 108. The amount of resources needed to encode image data depends largely on the amount and type of data to be encoded.

To increase the quality of an image, multiple characteristics may be used for pixel data. To further increase the quality of an image, larger scales may be used in association with each characteristic. To still further increase the quality of an image, the number of pixels per frame may be increased. As the number of pixels increases, as the number of characteristics per pixel increases, and as the scale of each characteristic increases, the corresponding amount of data per image frame increases.

Figure 3:
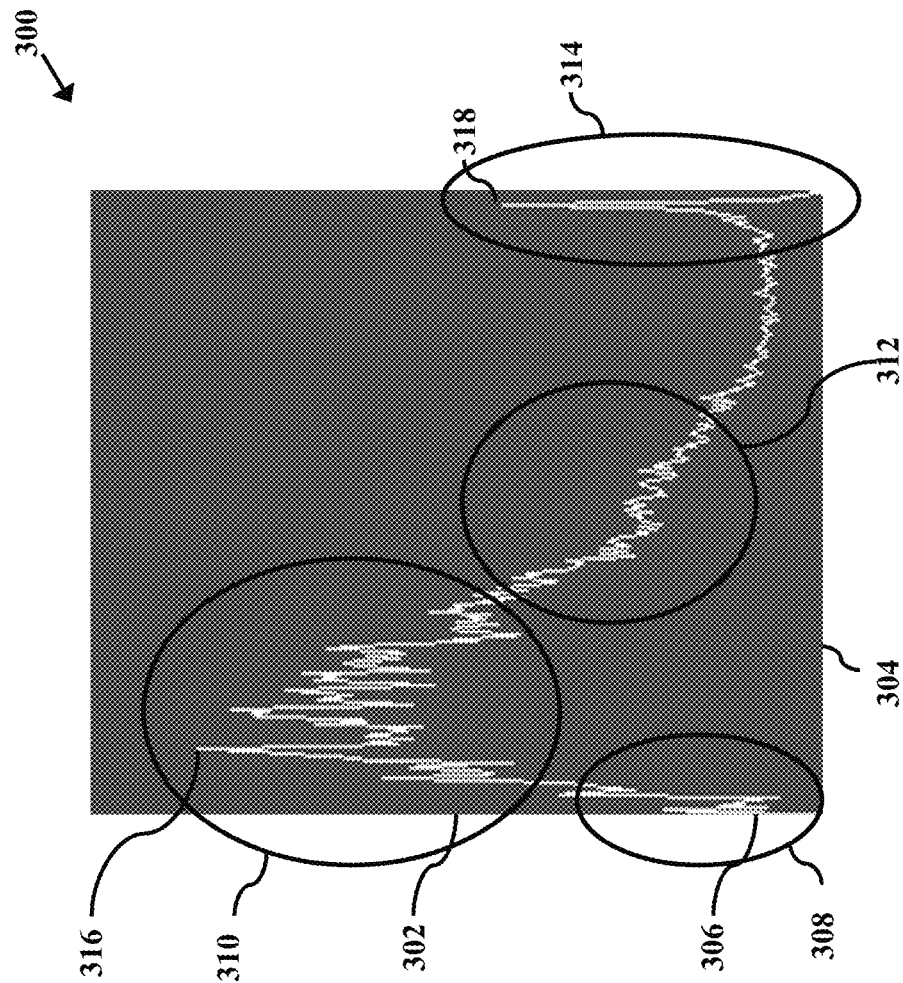
FIG. 3 illustrates an example histogram.

FIG. 3 illustrates a histogram 300. Histogram 300 includes a y-axis 302, an x-axis 304 and the function 306.

A histogram is a graphical representation showing a visual impression of a distribution of data. In this example, histogram 300 is a graphical representation showing a visual impression of a distribution of luminance of pixels of an image frame. Y-axis 302 measures a number of pixels within the frame, wherein the origin indicates no pixels and wherein the upper-most part of the y-axis indicates a maximum number of pixels. X-axis 304 measures luminance, wherein the origin indicates zero luminance (black), and the rightmost part of x-axis 304 indicates the maximum luminance. Function 306 shows the distribution of luminance of pixels within the frame.

Function 306 includes a portion indicated by ellipse 308, disposed near the origin of y-axis 302 and the origin of the x-axis 304. Accordingly, the portion of function 306 indicated by ellipse 308 indicates an amount of pixels having low luminance within the frame.

Function 306 includes a portion indicated by ellipse 310, disposed higher up y-axis 302 and to the right of the origin of x-axis 304. Accordingly, the portion of function 306 indicated by ellipse 310 indicates that there are many more pixels having a higher luminance within the frame as compared to the number of pixels having lower luminance in the frame (as indicated by ellipse 308).

Function 306 includes a portion indicated by ellipse 312, disposed lower down on y-axis 302 as compared to ellipse 310 and to the right on x-axis 304 as compared to ellipse 310. Accordingly, the portion of function 306 indicated by ellipse 312 indicates that the number of pixels having a higher luminance within the frame is decreasing.

Function 306 includes an isolated spike indicated by ellipse 314 that extends higher up y-axis 302 as compared to ellipse 306 and to the far right end of x-axis 304. Accordingly, the portion of function 306 indicated by ellipse 314 indicates that a number of pixels having a relatively high luminance and a relatively small deviation within the frame. As will be discussed in further detail below, an isolated spike, such as indicated by the portion of function 306 indicated by ellipse 314, may be an indicator of a strobe in a frame.

Figure 4:
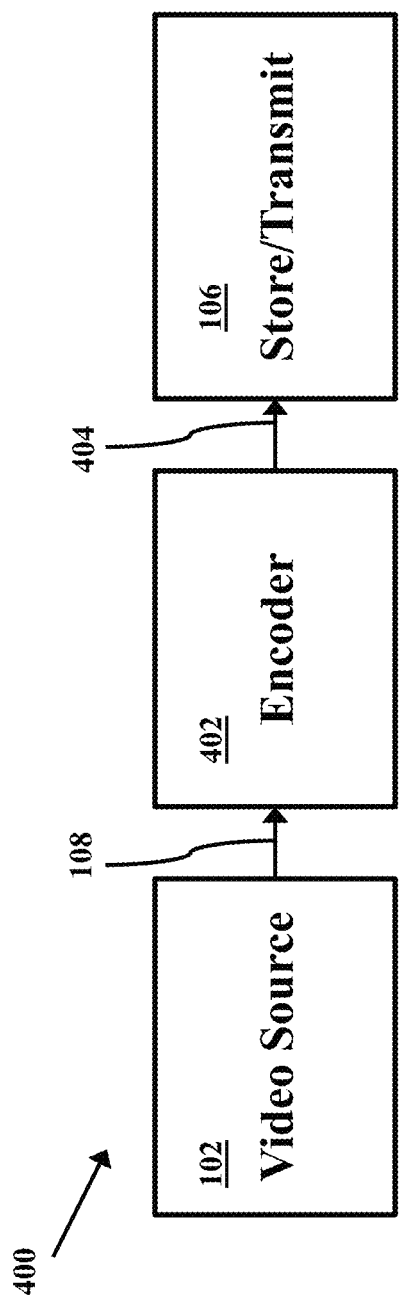
FIG. 4 illustrates an example video system.

FIG. 4 illustrates an example video system 400. As shown in figure, video system 400 includes video source 102, an encoder 402 and storage/transmission component 106.

Video source 102 is operable to provide image data 108 to encoder 402. Encoder 402 is operable to provide encoded data 404 to storage/transmission component 106.

Figure 5:
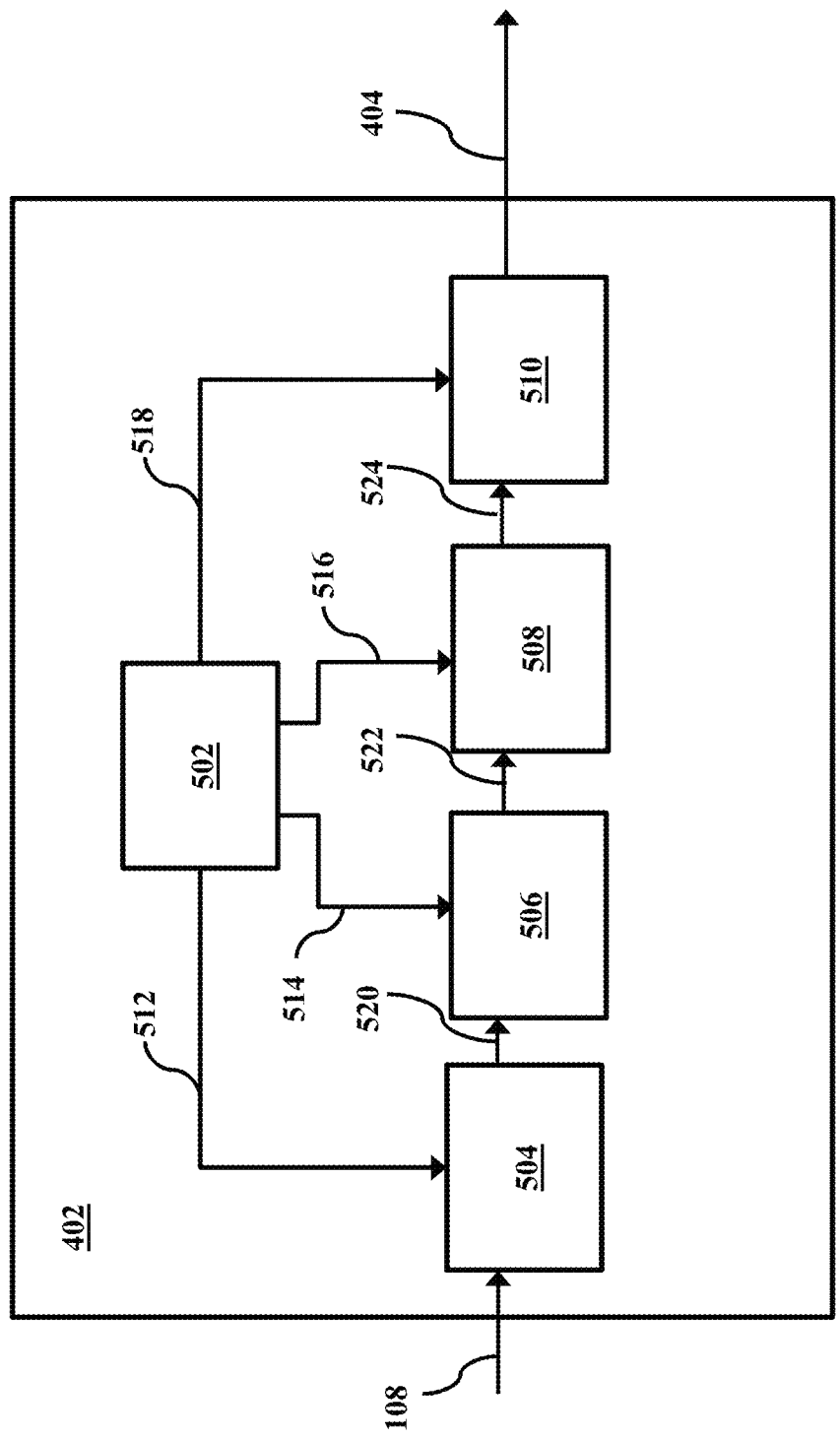
FIG. 5 illustrates example components of the encoder of FIG. 4.

FIG. 5 illustrates example components of encoder 402. As shown in figure, encoder 402 includes a controlling component 502, a histogram generating components 504, an analyzing component 506, a comparator 508 and an encoding component 510.

Controlling component 502 is operable to: control operation of histogram generating component 504 by way of a control signal 512; control operation of analyzing component 506 by way of a control signal 514; control operation of comparator 508 by way of a control signal 516; and control operation of an encoding component 510 by way of a signal 518.

Histogram generating component 504 is configured to receive image data 108 and control signal 512. Histogram generating component 504 is operable to generate a histogram based on image data 108 and output histogram data by way of a signal 520.

Analyzing component 506 is configured to receive signal 520 and control signal 514. Analyzing component 506 is operable to analyze the histogram, to identify an isolated spike in the histogram and to output a strobe parameter by way of a signal 522.

Comparator 508 is configured to receive control signal 516 and signal 522. Comparator 508 is operable to: compare the strobe parameter with a predetermined threshold; to output a first instruction signal, by way of a signal 524, when the strobe parameter is greater than the predetermined threshold; and to output a second instruction signal, by way of signal 524, when the strobe parameter is less than or equal to the predetermined threshold. As will be discussed in more detail below, in an example embodiment, comparator 508 is able to compare the strobe parameter with three predetermined thresholds. An example binary "yes strobe"/"no strobe" output is merely provided as an example embodiment for purposes of discussion. In other embodiments, a video encoder may be optimized based on how large the strobe is, or how bright, where it is located in the image, etc.

Encoding component 510 is configured to receive image data 108, control signal 518 and to receive signal 524. Encoding component 510 is operable to encode the image data in a first manner based on the first instruction signal and to encode image data in a second manner based on the second instruction signal. Encoding component 510 is further operable to output the entered image data as encoded data 404.

A more detailed discussion of the operation of encoder 402 will now be described with additional reference to FIGS. 6-10.

Figure 6:
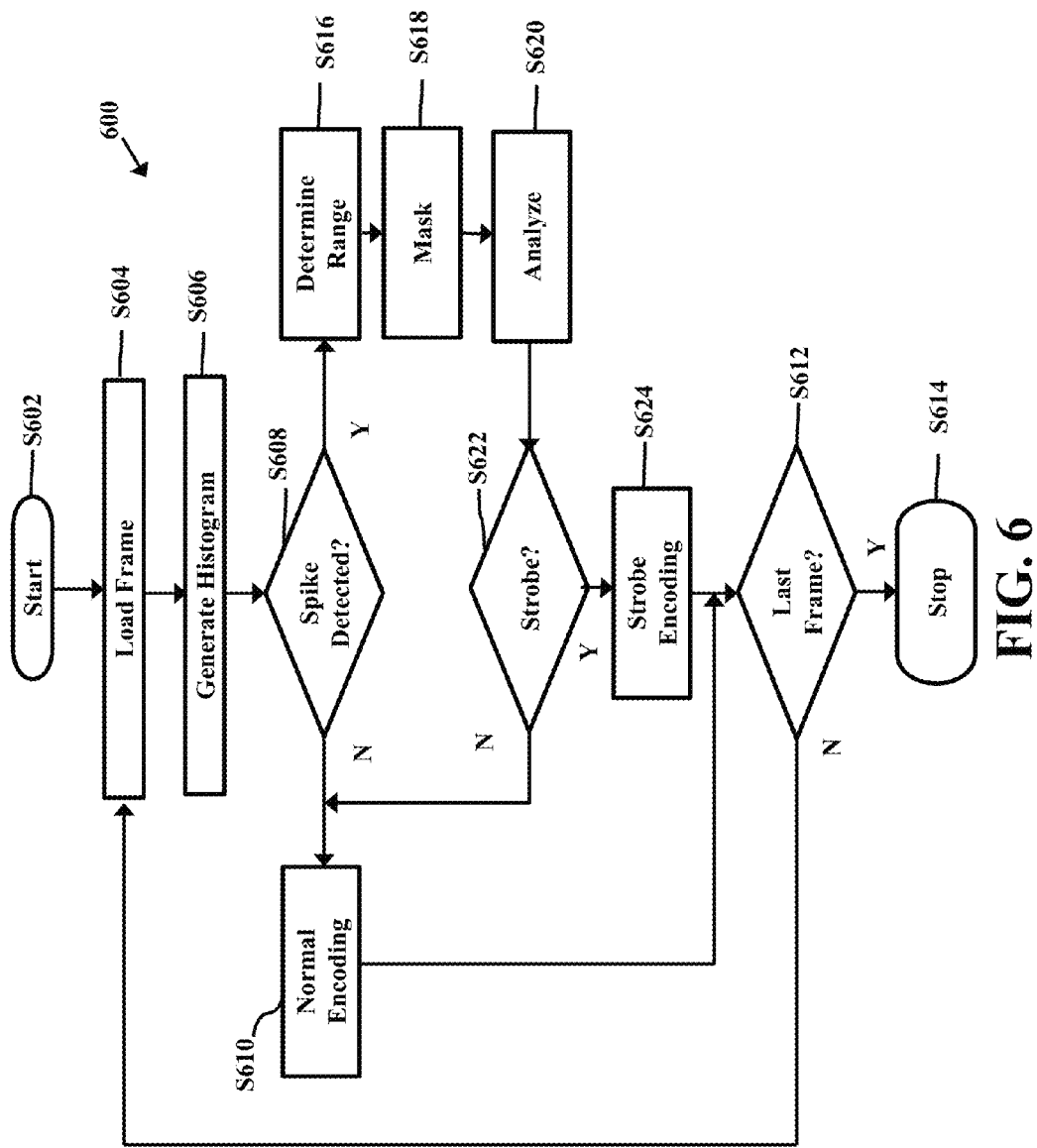
FIG. 6 illustrates an example method of operating encoder of FIG. 4.

FIG. 6 illustrates an example method 600 of operating encoder 402.

As shown in FIG. 6, method 600 starts (S602), and a frame is loaded (S604). For example, returning to FIG. 5, histogram generating component 504 receives image data 108, which includes image data corresponding to a frame. In this example, let image data 108 include data corresponding to image frame 200 of FIG. 2.

Returning to FIG. 6, after the frame is loaded, a histogram is generated for that frame (S606). In an example embodiment, as shown in FIG. 5, controlling component 502 instructs histogram generating component 504, via control signal 512, to analyze data associated with a pixel in image data 108 to determine the luminance of that pixel. Histogram generating component 504 will repeat this process until all the pixels in image data 108 are analyzed. For example, consider histogram 300 of FIG. 3. For any particular luminance along x-axis 304, the corresponding coordinate along y-axis 302 illustrates the number of pixels within image data 108 having that particular luminance. For example, as shown at point 316, the most common luminance is shown in the highest peak within ellipse 310. Similarly, as shown at 318, a large number of pixels share an extremely large luminance is shown in the highest peak within ellipse 314, which is an indication of a strobe.

Once generated, controlling component 502 instructs histogram generating component 504, via control signal 512, to provide the histogram to analyzing component 506 via signal 520.

Returning to FIG. 6, after the histogram is generated, it is determined whether a spike is detected in the histogram (S608). In the example embodiment, controlling component 502 instructs analyzing component 506, via control signal 514, and instructs comparator 508, via control signal 516, to make such a determination. This portion of method 600 will be described in greater detail with reference to FIG. 7.

Figure 7:
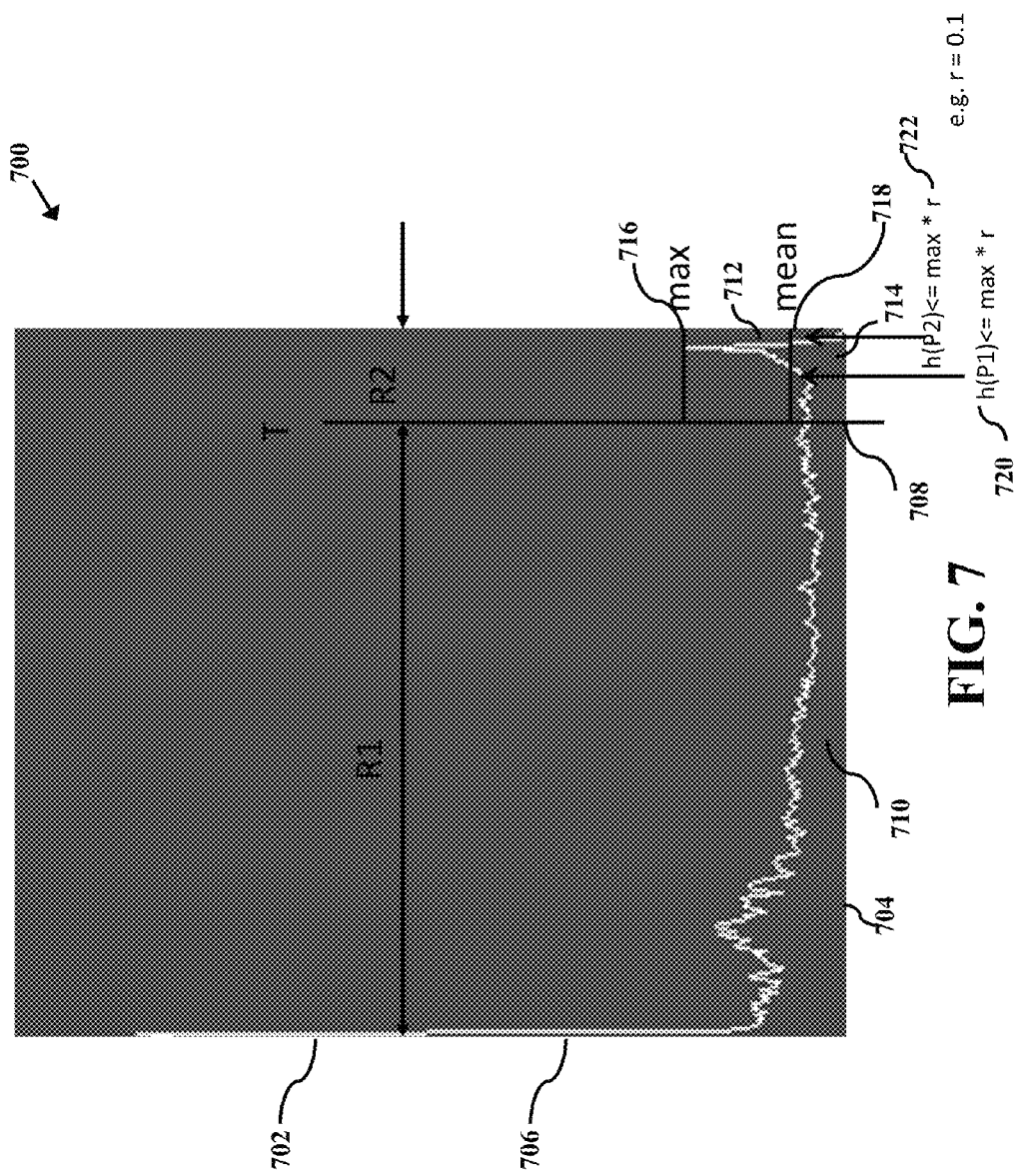
FIG. 7 illustrates an example histogram.

FIG. 7 illustrates a histogram 700. As shown in the figure, histogram 700 includes a y-axis 702, an x-axis 704 and a function 706. For purposes of discussion histogram 700 corresponds to a first frame being analyzed by encoder 402.

Analyzing component 506 defines a threshold T at point 708, which partitions histogram 700 into two regions: region 710 and region 712. Region 710 is defined by x-axis points [0,T−1], whereas region 712 is defined by x-axis points [T,255].

Analyzing component 506 then defines three features, $F_1$, $F_2$ and $F_3$.

In an example embodiment, $F_1$ is defined as (Area of $R_2$)/(Area of $R_1$). Generally speaking, $F_1$ is a comparison of the number of pixels within region $R_2$ and the number of pixels within region $R_1$. Using the example of FIG. 7, if a significant number of pixels fall in region 712, as compared to the number of pixels within region 710, there is a possibility of a strobe.

$F_2$, in an example embodiment, is defined as Max($R_2$)/Mean($R_2$). Generally speaking, $F_2$ is used to establish a distribution of the number of pixels that fall in region 712. In this example embodiment, $F_2$ is defined by the largest number of pixels for a particular luminance value within region $R_2$ divided by the mean number of pixels for all luminance values within region $R_2$. Using the example of FIG. 7, $F_2$ is defined by the largest number of pixels for a luminance value, indicated by line 716, within region 712 divided by the mean number of pixels for all luminance values, indicated by line 718, within region 712. In this example, the luminance value associated with line 716 is at point 714 on x-axis 704.

In an example embodiment, $F_3$ is defined as (Area of P)/(Area of $R_2$), where the Area of P is the area under the peak within region $R_2$. The details for an example method of determining the domain of P are given below. Generally speaking, $F_3$ is a comparison of the number of pixels within the peak in region $R_2$ and the number of pixels within the entire region $R_2$.

First the peak is defined. In an example embodiment analyzing component 506 sets a value r, and determines that the peak is bounded on x-axis of the histogram at r*Max($R_2$). Using the example of FIG. 7, and using an example of r=0.1, the domain of P is 0.1 times the histogram value (i.e. number of pixels) at point 714 in a positive and negative direction along x-axis 704. Accordingly, in this example, the domain of P is from the point 720 on x-axis 704 to point 722 on x-axis 704. Mathematically, point 720 is determined as point $P_1$ such that the histogram value h($P_1$)<r*Max($R_2$) and h($P_1$+1)>=r*Max($R_2$). Similarly, point 722 is determined as $P_2$ such that the histogram value h($P_2$)<r*Max($R_2$) and h($P_2$−1)>=r*Max($R_2$). For discrete values, there may not be an integer P, such that h(P)=r*Max. Accordingly, in an example embodiment, an inequality is used to define point P. In alternate embodiments, denote Xp as the x-axis position at point 714 corresponding to Max($R_2$), then the peak point is characterized by x and y value [Xp, h(Xp)]. One can start from [Xp, h(Xp)] and search towards left (x decreases) until h($P_1$)>=h($P_1$+1) which defines $P_1$. Similarly one can search towards the right starting from [Xp, h(Xp)] to find $P_2$. In yet another alternate embodiment, a variable slope line passing through the point [Xp, h(Xp)] can be used to approximate the left (ramp up) and right (ramp down) boundary of the peak indicated by line 716. The intersection between function 706 and the approximation lines of left and right ramp determines $P_1$ and $P_2$.

Now that the domain of P is determined, the area of P may be determined, i.e., the number of pixels within the image frame that are disposed in the isolated spike. With the area of P determined, $F_3$ is then determined as (Area of P)/(Area of $R_2$). Using the example of FIG. 7, $F_3$ is defined by number of pixels having a luminance value between that defined by points 720 and 722 on x-axis 704 divided by the number of pixels within region 712.

Returning to FIG. 5, controlling component 502 then instructs analyzing component 506, via signal 514, to provide $F_1$, $F_2$ and $F_3$ to comparator 508 via signal 522.

In an example embodiment, comparator 508 has stored therein, a first threshold $T_1$, a second threshold $T_2$, and a third threshold $T_3$. Threshold $T_1$ determines if there is a large distribution of pixels at the very bright end of the histogram marked by the border between region $R_1$ and $R_2$. Threshold $T_2$ is a minimum value to identify a "spike" in region $R_2$. Threshold $T_3$ is a minimum value to determine whether a strobe exists based on the bright pixel concentration in area $R_2$. Non-limiting examples of ways to define $T_1$, $T_2$, and $T_3$ are empirical observation, training of support vector machines, and other machine learning technologies.

Comparator 508 compares $F_1$ with $T_1$. If $F_1$ is greater than $T_1$, then a significant number of pixels fall into region $R_2$. Using the example of FIG. 7, if the number of pixels that fall within region 712 is sufficiently high as compared to the number of pixels that fall within region 710, such that $F_1 > T_1$, then there is a possibility of a strobe for the frame. Alternatively, in the event that $F_1$ is $\leq T_1$, there is no strobe detected for the frame.

Comparator 508 additionally compares $F_2$ with $T_2$. It $F_2$ is greater than $T_2$, it means that there is an identifiable isolated spike in region $R_2$. In the event that $F_2$ is $\leq T_2$, there is no strobe detected for the frame, even if it is determined that $F_1 > T_1$.

Comparator 508 additionally compares $F_3$ with $T_3$. If $F_3$ is greater than $T_3$, it indicates that pixels are highly concentrated in the peak—more of a spike as opposed to a hill. In the event that $F_3$ is $\leq T_3$, there is no strobe detected for the frame, even if it is determined that $F_1 > T_1$ and that $F_2 > T_2$.

Returning to FIG. 6, if no spike is detected (NO at S608) then the frame may be encoded in a first manner which is optimal for video frames in which no strobe is present (S610). For example, as shown in FIG. 5, in the event that $F_1 \leq T_1$, $F_2 \leq T_2$ or $F_3 \leq T_3$, comparator 508 provides a non-strobe instruction signal, via signal 524, to encoding component 510. Encoding component may then encode the frame in a first manner.

It is then determined whether the current frame is the last frame to be encoded (S612). For example, histogram generating component 504 determines whether an additional frame is included in image data 108. If it is determined that another frame is to be encoded (NO at S612), then the next frame is loaded (S604) and method 600 continues. Alternatively, if it is determined that no other frames are to be encoded (YES at S612), then method 600 stops (S614).

If a spike is detected (YES at S608), then the brightness range is determined (S616). In one example embodiment, the brightness range is determined by finding the boundary for the identified peak 716: [$P_1$, $P_2$]. In an alternate embodiment, $P_2$ is fixed to be 255 and the brightness range becomes [$P_1$, 255]. In an alternate embodiment, in order to remove noise that may affect the peak boundary detection, preprocessing is applied to histogram 700 prior to searching for the peak and its boundary. In one embodiment, the preprocessing is low-pass filtering.

A binary mask is then generated to signal the spatial location of strobe sources (S618). For example, controlling component 502 may instruct analyzing component 506, via control signal 514, to generate a binary mask for the frame. It is possible that extremely bright objects, which are not strobes, within the frame can formulate an isolated spike, thus leading to a false positive identification of a strobe. The binary mask will help identify probably strobes. This will be described in greater detail with reference to FIGS. 8-10.

Figure 8:
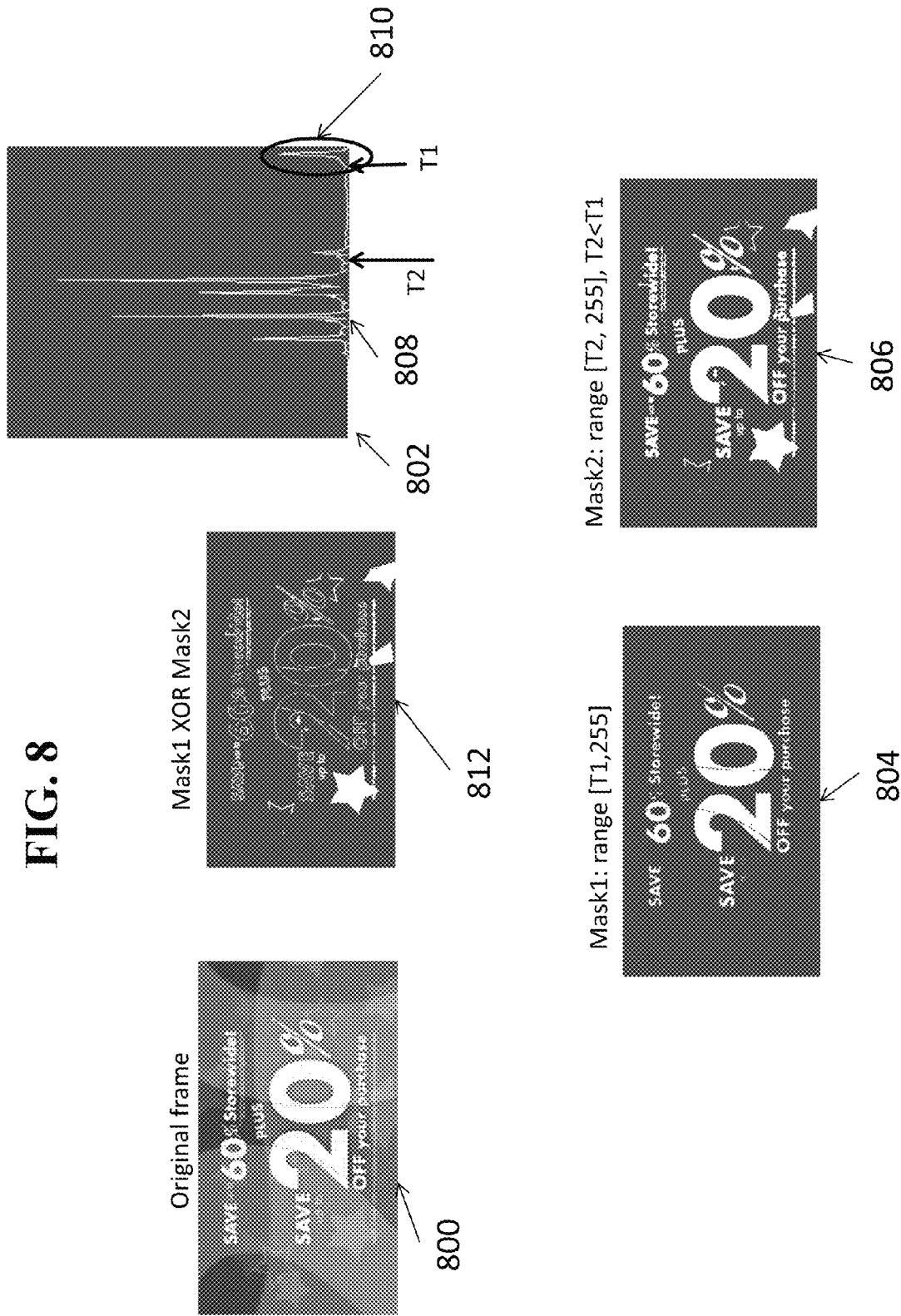
FIG. 8 illustrates an example original frame, a corresponding histogram and three masks.

FIG. 8 illustrates an original frame 800, a histogram 802, a mask 804, a mask 806 and a mask 812. In this example, the image in original frame 800 is comprised mostly of pixels with middle range luminance, and then some pixels with very high luminance, the very bright text. Corresponding histogram 802 includes a plurality of middle range spikes 808 indicating a large amount of pixels at the middle range luminance scale and a spike 810 indicating a small amount of pixels at the higher luminance scale. Clearly, in this example, histogram 802 includes isolated spike 810. The question remains as to whether 810 is representative of a strobe. As evidenced by original frame 800, isolated spike 810 in this case is not representative of a strobe.

Mask 804 corresponds to original frame 800 as processed with a brightness range $[T_1, 255]$. Any pixels within original frame 800 having a brightness greater than or equal to $T_1$ will show up in mask 804 as a binary 1 (white), whereas any pixels within original frame 800 having a brightness less than $T_1$ will show up in mask 804 as a binary zero (black). Mask 806 corresponds to original frame 800 as processed with a brightness of $[T_2, 255]$ where $T_2<T_1$. Any pixels within original frame 800 having a brightness greater than or equal to $T_2$ will show up in mask 804 as a binary 1 (white), whereas any pixels within original frame 800 having a brightness less than $T_2$ will show up in mask 804 as a binary zero (black). Mask 812 is determined by taking binary XOR (exclusive OR) between mask 804 and mask 806, or equivalently, mask 812 corresponds to original frame 800 as processed with a third mask having brightness range $[T_2, T_1]$.

In one example embodiment, $T_1$ is determined as the left boundary, e.g., $P_1$ in step S616, of the identified spike. For a true strobe, the first mask generated by the brightness range $[T_1, 255]$ should cover the bright core of the strobe source. Now, $T_2<T_1$, which means more darker pixels are included in the second mask generated by applying the brightness range $[T_2, 255]$. If the bright object is indeed a strobe, then the second mask should include pixels from the transition strip, and these pixels should in general be spatially co-located with the bright core pixels. On the other hand, if the bright object is not a strobe, as in this example frame 800, then there are not much additional pixels included in the second mask. This is also evident from the histogram: not many pixels are distributed in the range $[T_2, T_1]$.

Returning to FIG. 8, a differential pixel ratio, $R_d$, is determined by dividing the number of pixels of the transition strip, e.g., mask 812 with the number of pixels of mask 806. Therefore, if a spike is identified, comparing the differential pixel ratio with a predetermined threshold $T_d$ may determine whether the frame 800 is a strobe frame. If $R_d>T_d$, it is determined to be a strobe frame. Otherwise, if $R_d<=T_d$, frame 800 is determined to be not a strobe frame because there are not enough pixels in the transition strip. In general, even if there are pixels distributed between $[T_2, T_1]$, for a non-strobe bright object, the extra pixels tend to be not spatially co-located with the bright core which is determined as the first mask. In one example embodiment, a third mask is determined by the range $[T_2, T_1]$, and the spatial pixel distribution of the third mask is compared to spatial pixel distribution of the first mask with the range $[T_1, 255]$. If they are not co-located, then the detected isolated spike does not correspond to a strobe. In one example embodiment, the spatial co-location check is done by comparing the horizontal and vertical projections (number of mask pixels in each horizontal/vertical line) of the first mask and the third mask.

The results of the binary mask are then analyzed (S620). For example, controlling component 502 may instruct the analyzing component, via control signal 514, to analyze an applied binary mask to determine whether a detected isolated spike corresponds to a strobe. This will be described in greater detail with reference to FIGS. 9-10.

Figure 9:
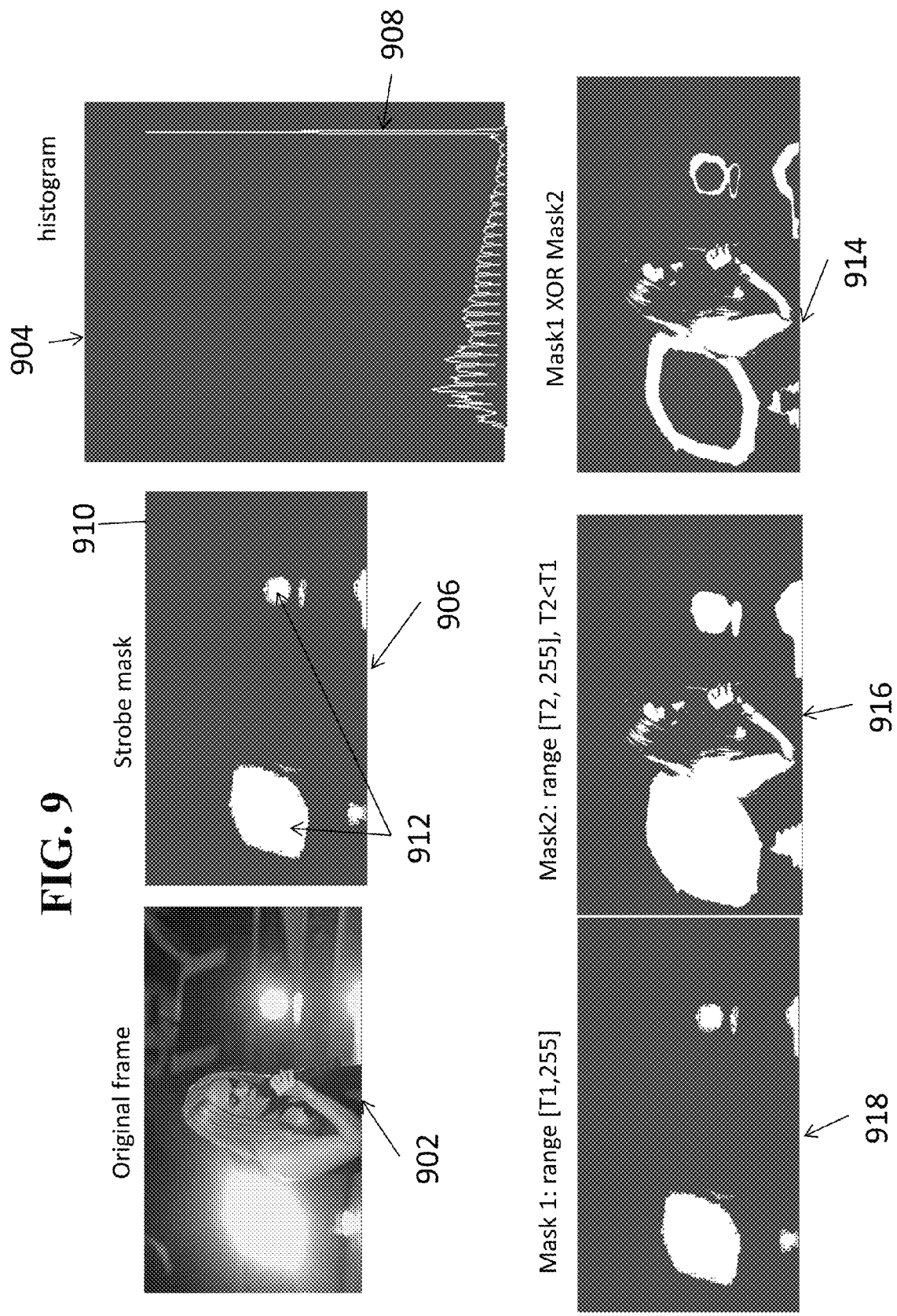
FIG. 9 illustrates another example original frame, a corresponding histogram and four masks.

FIG. 9 illustrates an original frame 902, a histogram 904 and masks 906, 914, 916 and 918. In this example, the image in original frame 902 has a plurality of strobes. Corresponding histogram 904 includes a very tall isolated spike 908 indicating a large amount of pixels at the higher luminance scale. The question remains as to whether 908 is representative of a strobe. Mask 906 is a binary mask illustrating which pixels within original frame 902 are in the luminance range $[P_1, P_2]$ in step S616. Mask 918 corresponds to original frame 902 as processed with brightness range $[T_1, 255]$. Any pixels within original frame 902 having a brightness greater than or equal to $T_1$ will show up in mask 918 as a binary 1 (white), whereas any pixels within original frame 902 having a brightness less than $T_1$ will show up in mask 918 as a binary zero (black). Mask 916 corresponds to original frame 902 as processed with a second mask having $[T_2, 255]$ where $T_2<T_1$. Any pixels within original frame 902 having a brightness greater than or equal to $T_2$ will show up in mask 916 as a binary 1 (white), whereas any pixels within original frame 902 having a brightness less than $T_2$ will show up in mask 916 as a binary zero (black). Frame 914 is the mask for a differential pixel map having brightness range $[T_2, T_1]$, which shows the pixels of the transition strip. Any pixels within original frame 902 having a brightness greater than or equal to $T_2$ and less than or equal to $T_1$ will show up in mask 914 as a binary 1 (white), whereas any pixels within original frame 902 having a brightness less than $T_2$ and greater than $T_1$ will show up in mask 914 as a binary zero (black).

Clearly, the pixels in mask 914 show the transition strip pixels spatially co-located (enclosing) the strobe mask in frame 902. Since frame 902 has transition pixels as shown in mask 914 and passed the verification test, e.g., $R_d>T_d$, it is determined to be a strobe. A strobe is not verified by the shape of its core, but by the detection of the existence of the transition stripe. For a non-strobe bright object, either there is much less transition strip pixels, e.g., $R_d \leq T_d$, for example as shown in FIG. 8, or the detected transition strip pixels are not spatially co-located (surrounding) the core.

Another example of strobe masks to verify whether a frame includes a strobe will now be discussed with reference to FIG. 10.

Figure 10:
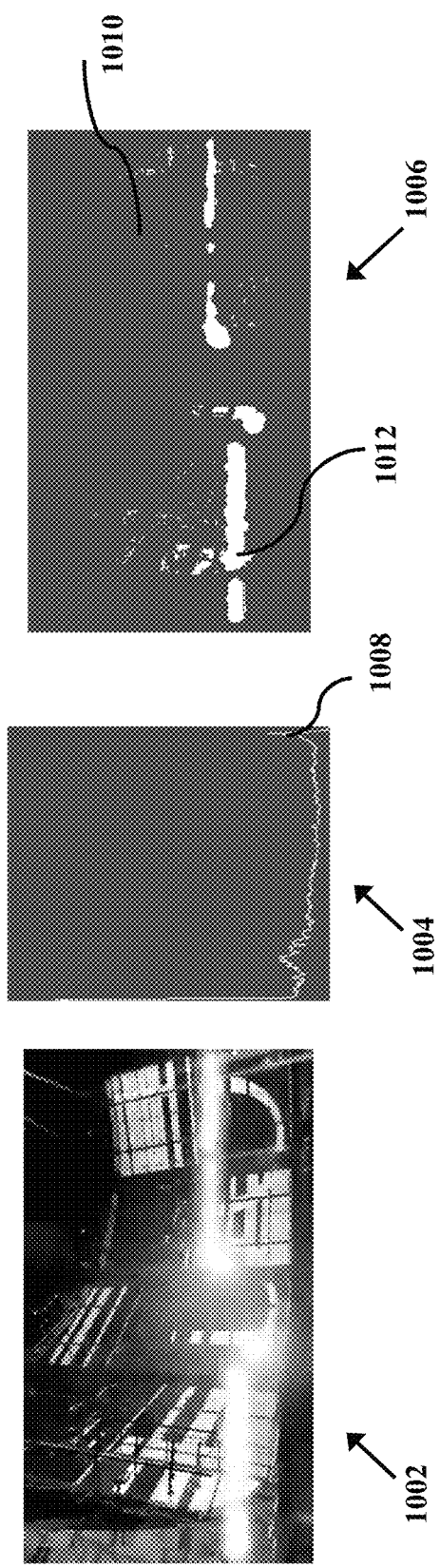
FIG. 10 illustrates another example original frame, a corresponding histogram and one mask.

FIG. 10 illustrates another original frame 1002, a histogram 1004 and a mask 1006. In this example, the image in original frame 1002 has a plurality of strobes. Corresponding histogram 1004 includes an isolated spike 1008 indicating a large amount of pixels at the higher luminance scale. Clearly, in this example, histogram 1004 includes isolated spike 1008. The question remains as to whether 1008 is representative of a strobe. Again the frame exhibits transition strip pixels and passes the strobe test, thus providing indication of a strobe in frame 1002.

If the strobe mask provides additional indication of a strobe, after identification of the isolated spike in the histogram, then controlling component 502 uses the two masks for strobe verification as discussed above.

Returning to FIG. 6, it is then determined whether a strobe is detected (S622). If a strobe is not detected (NO at S622), then the frame may be encoded in a first manner (S610). It is then determined whether the current frame is the last frame to be encoded (S612). If it is determined that another frame is to be encoded (NO at S612), then the next frame is loaded (S604) and method 600 continues. Alternatively, if it is determined that no other frames are to be encoded (YES at S612), then method 600 stops (S614).

Alternatively, if a strobe is detected (YES at S622), then the frame may be encoded in a second manner which is optimal for video frames in which a strobe is present (S624). It is then determined whether the current frame is the last frame to be encoded (S612). If it is determined that another frame is to be encoded (NO at S612), then the next frame is loaded (S604) and method 600 continues. Alternatively, if it is determined that no other frames are to be encoded (YES at S612), then method 600 stops (S614).

The above discussion with reference to FIGS. 4-10 describes embodiments where a strobe is identified by analyzing an entire frame. However, in accordance with other embodiments, a strobe may be identified by analyzing portions of a frame. This will now be described with reference to FIGS. 11-14. The bright pixel distribution at the bright end of a histogram depends on the ratio of total number of bright pixels (gray level larger than threshold T at point 708) divided by the total number of pixels of the measuring area. If the strobe source is relatively small in area compared to the whole frame, then its distribution at the whole frame histogram will be weak and might be missed in detection. On the other hand, if the histogram is generated over a block which contains the strobe source and the block is smaller in size than the whole frame, then the distribution of the strobe pixels at the histogram will be stronger, therefore can be more robustly detected.

Figure 11:
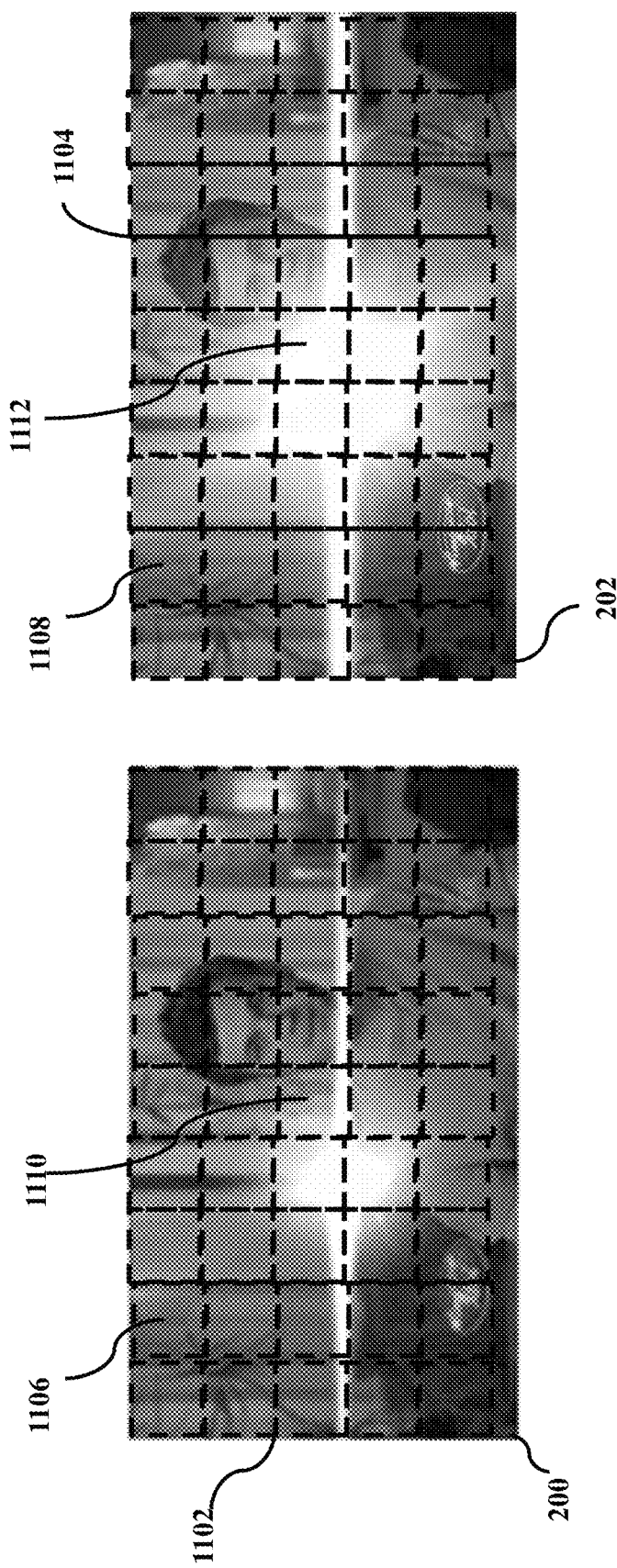
FIG. 11 illustrates two example image frames as divided into a plurality of sections.

FIG. 11 illustrates image frame 200 as divided into a plurality of sections 1102 and image frame 202 as divided into a plurality of sections 1104.

Figure 12:
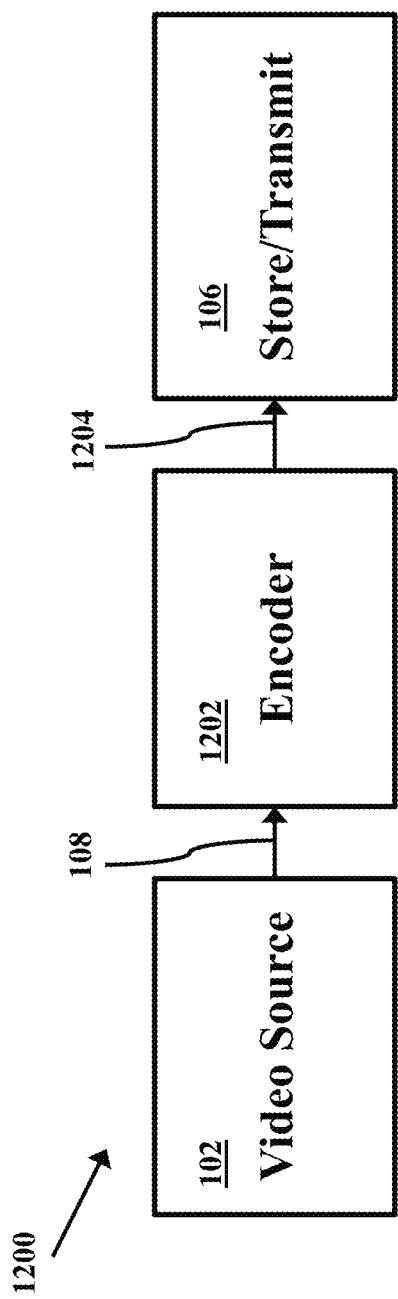
FIG. 12 illustrates another example video system.

FIG. 12 illustrates another example video system 1200. As shown in the figure, video system 1200 includes video source 102, an encoder 1202 and storage/transmission component 106. Video source 102 to is operable to provide image data 108 to encoder 1202. Encoder 1202 is operable to provide encoded data 1204 to storage/transmission component 106. Video system 1200 is similar to video system 400 of FIG. 4, but differs in the sense that encoder 1202 will process an image frame by processing the plurality of sections.

Figure 13:
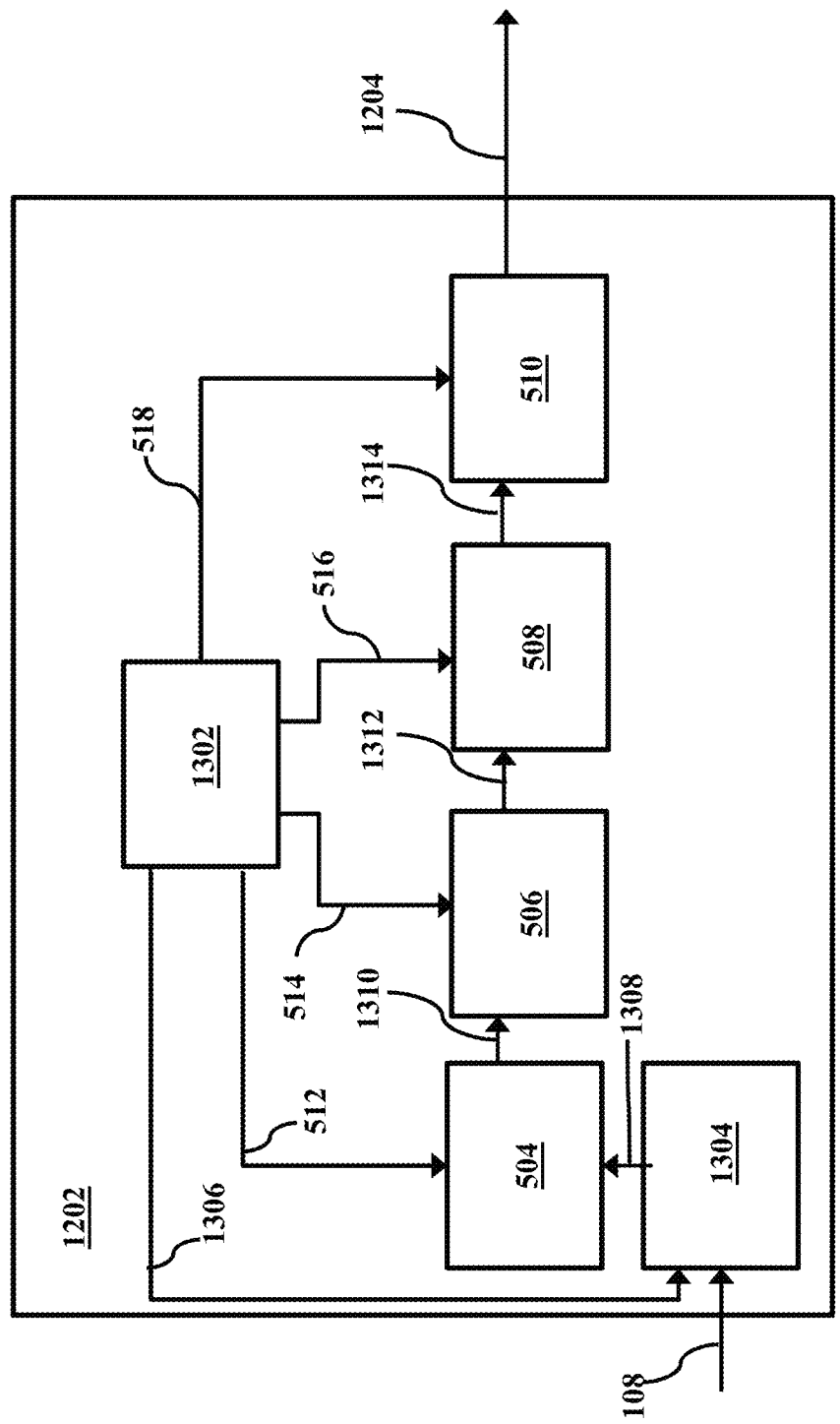
FIG. 13 illustrates example components of the encoder of FIG. 12.

FIG. 13 illustrates example components of encoder 1202. As shown in the figure, encoder 1202 includes a controlling component 1302, an image dividing component 1304, histogram generating components 504, analyzing component 506, comparator 508 and encoding component 510.

Controlling component 1302 is operable to: control operation of image dividing component 1304 by way of a control signal 1306; control operation of histogram generating component 504 by way of control signal 512; control operation of analyzing component 506 by way of control signal 514; control operation of comparator 508 by way of control signal 516; and control operation of an encoding component 510 by way of signal 518.

Image dividing component 1304 is configured to receive image data 108 and control signal 1202. Image dividing component 1304 is operable to generate sections of image data based on image data 108 and output the sections of image data 1308.

Histogram generating component 504 is configured to receive sections of image data 1308 and control signal 512. Histogram generating component 504 is operable to generate a histogram based on sections of image data 1308 and output sectional histogram data by way of a signal 1310.

Analyzing component 506 is configured to receive signal 1310 and control signal 514. Analyzing component 506 is operable to analyze the sectional histogram, to identify an isolated spike in the sectional histogram and to output a strobe parameter by way of a signal 1312.

Comparator 508 is configured to receive control signal 516 and signal 1312. Comparator 508 is operable to: compare the strobe parameter with a predetermined threshold; to output a first instruction signal, by way of a signal 1314, when the strobe parameter is greater than the predetermined threshold; and to output a second instruction signal, by way of signal 1314, when the strobe parameter is less than or equal to the predetermined threshold.

Encoding component 510 is configured to receive control signal 518 and to receive signal 1314. Encoding component 510 is operable to encode the image data in a first manner based on the first instruction signal and to encode image data in a second manner based on the second instruction signal. Encoding component 510 is further operable to output the entered image data as encoded data 404.

Encoder 1202 is similar to encoder 402 of FIG. 5, but differs in the sense that encoder 1202 includes image dividing component 1304 and controlling component 1302 is additionally able to control image dividing component 1304. A more detailed discussion of the operation of encoder 402 will now be described with additional reference to FIGS. 6-10.

Figure 14:
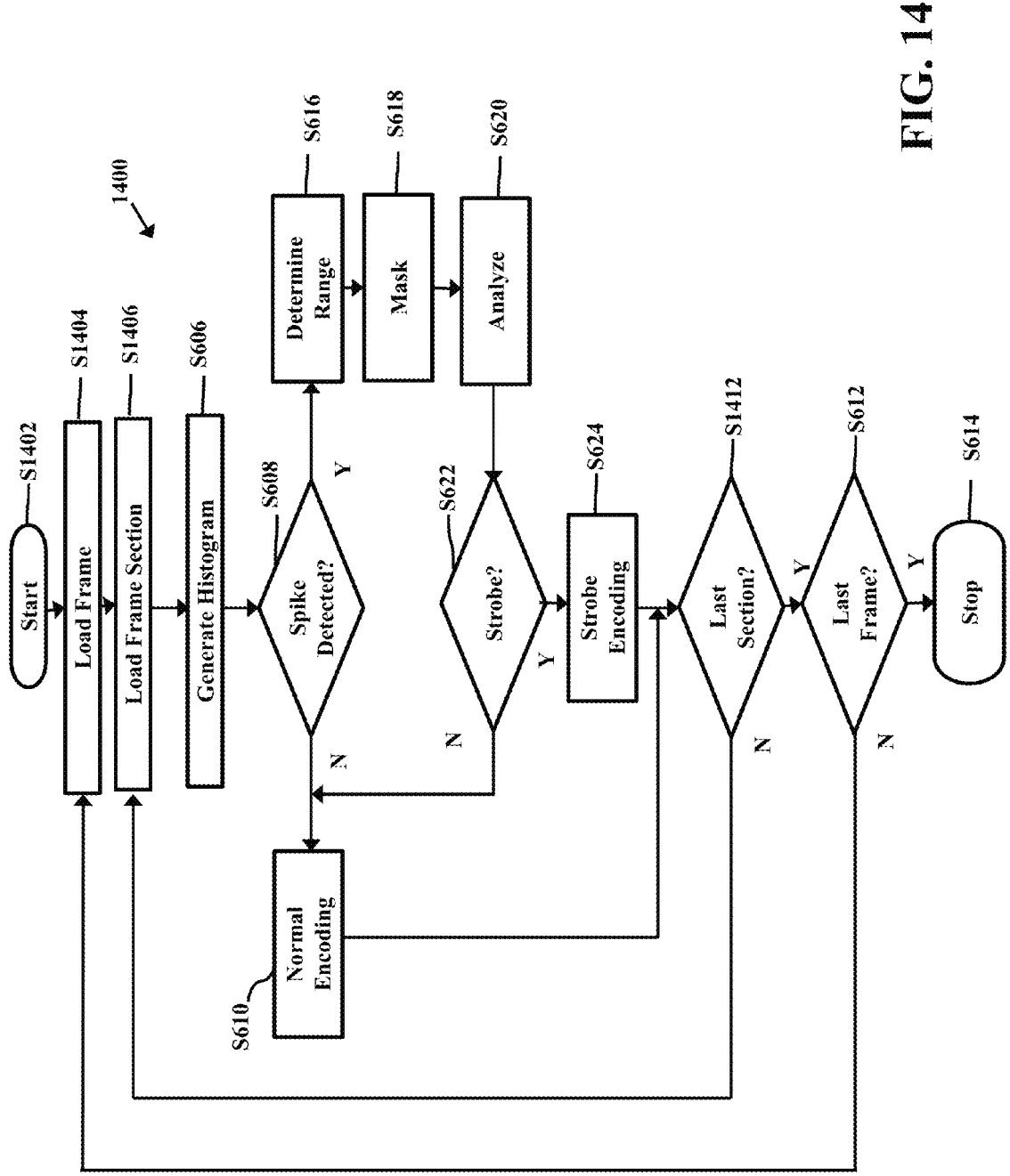
FIG. 14 illustrates an example method of operating the encoder of FIG. 13.

FIG. 14 illustrates an example method 1400 of operating encoder 1202.

As shown in FIG. 14, method 1400 starts (S1402), and a frame is loaded (S1404). For example, returning to FIG. 13, image dividing component 1304 receives image data 108, which includes image data corresponding to a frame.

Returning to FIG. 14, after the frame is loaded, a frame section is loaded (S1406). For example, as show in FIG. 13, controlling component 1302 instructs image dividing component 1304 to divide the image frame into sections. For example, as shown in FIG. 11, image frame 200 is divided into a plurality of sections 1102. Controlling component 1302 then instructs image dividing component 1304, via control signal 1306, to provide the image data corresponding to a first section to histogram generating component 504 via signal 1308.

Returning to FIG. 14, after the frame section is loaded, a histogram is generated for that frame section (S606). The method portions S606, S608, S610, S612, S614, S616, S618, S620, S622 and S624 of method 1400 are similar to method 600 discussed above, with the exception that a frame section is processed as opposed to an entire frame.

Once a frame section is encoded (either one of S610 or S624), it is then determined whether the current section is the last section (S1412). If the current section is not the last section in the frame (NO at S1412), then the next frame section in the frame is loaded (S1406) and method 1400 continues.

Accordingly, in method 1400 when determining whether a spike is detected (S608), analyzing component 506 and comparator 508 operate with data corresponding to a frame section. As such, by the time the last section of a frame is analyzed, analyzing component 506 will have analyzed the frame by analyzing the histogram of each section of image data individually. Further, by the time the last section of a frame is analyzed, analyzing component 506 will have identified a spike in each section by analyzing each individual histogram. Still further, by the time the last section of a frame is analyzed, analyzing component 506 will have outputted a strobe parameter for each individual histogram. Similarly, by the time the last section of a frame is analyzed, comparator 508 will have compared each strobe parameter with predetermined thresholds and outputted instructions to encoding component 510 as to how to encode each section.

If the current section is the last section in the frame (YES at S1412), it is then determined as to whether the current frame is the last frame (S612). If it is determined that another frame is to be encoded (NO at S612), then the next frame is loaded (S1404) and method 1400 continues. Alternatively, if it is determined that no other frames are to be encoded (YES at S612), then method 1400 stops (S614).

In method 1400, the individual sections of image data are analyzed. In other embodiments, sections may be analyzed in an overlapped manner. This will be discussed with reference to FIGS. 15A-B. Without knowing where the strobe pixels are located, overlapped section partitions may enhance the chance that a section contains a majority of the strobe pixels, hence making the detection more robust.

Figure 15B:
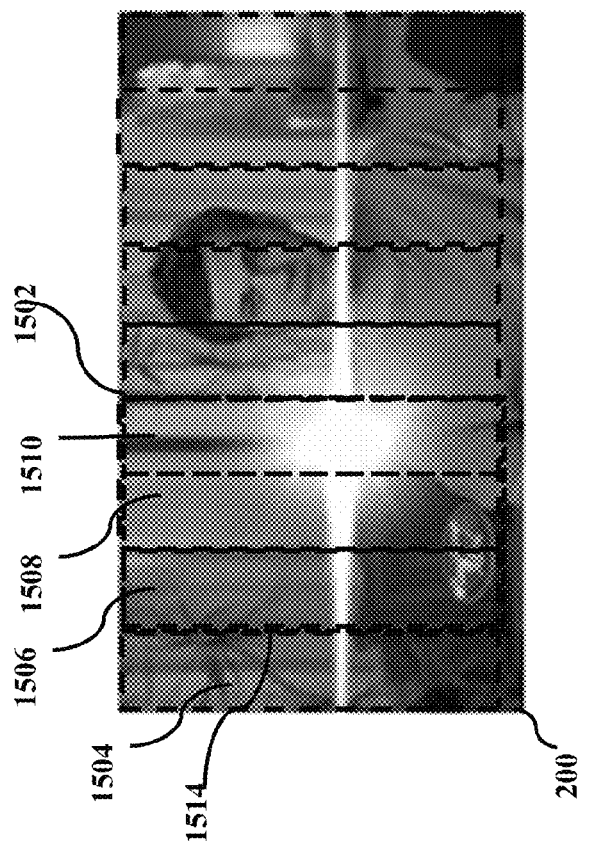
FIGS. 15A-B illustrates an image frame as divided into a plurality of sections.
Figure 15A:
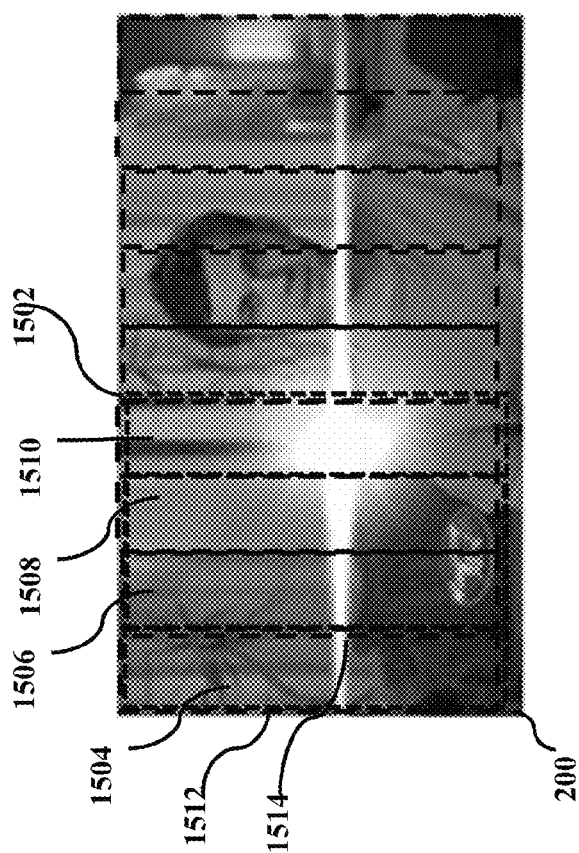

FIGS. 15A-B illustrates image frame 200 as divided into a plurality of sections 1502. In FIG. 15A, sections 1504, 1506 and 1508 are grouped together as section 1512 for analysis. Alternatively, in FIG. 15A, sections 1506, 1508 and 1510 can be grouped together as section 1514 for analysis. It is clear that section 1512 and 1514 overlaps with each other. In FIG. 15B, sections 1506, 1508 and 1510 are grouped together as section 1514 for analysis.

Aspects of the present disclosure are drawn to a system and method for detecting a strobe via spatial features of an image frame. A histogram of an image frame is created and examined for an isolated spike. The isolated spike is then analyzed to determine whether it is sufficiently large to be associated with a strobe.

The foregoing description of various preferred embodiments have been presented for purposes of illustration and description. It is not intended to be exhaustive or to limit embodiments to the precise forms disclosed, and obviously many modifications and variations are possible in light of the above teaching. The example embodiments, as described above, were chosen and described in order to best explain the principles of embodiments and their practical application to thereby enable others skilled in the art to best utilize embodiments and with various modifications as are suited to the particular use contemplated. It is intended that the scope of embodiments be defined by the claims appended hereto.

We claim:

1. A video processing method comprising:
   generating, via a histogram generating component, a histogram for image data of an image frame;
   analyzing, via an analyzing component, the histogram;
   identifying, via the analyzing component, an isolated spike in the histogram; and
   outputting, via the analyzing component, at least one strobe parameter indicating the possibility of a strobe within the image frame;
   wherein said identifying the isolated spike comprises identifying the isolated spike by establishing a region threshold that partitions the histogram into a first region and a second region, and by establishing sub-region thresholds that partition the second region into a first sub-region and a second sub-region.

2. The video processing method of claim 1, further comprising:
   comparing, via a comparator, the at least one strobe parameter with at least one predetermined threshold;
   outputting, via the comparator, a first instruction signal when the at least one comparison operation is indicative of a strobe; and
   outputting, via the comparator, a second instruction signal when the at least one comparison operation is not indicative of a strobe.

3. The video processing method of claim 1, wherein said generating a histogram comprises generating the histogram for image data of the image frame based on luminance of pixels of the image frame.

4. The video processing method of claim 1, wherein said generating a histogram comprises generating the histogram for image data of the image frame based on chrominance of the pixels of the image frame.

5. The video processing method of claim 1, wherein said identifying the isolated spike further comprises identifying the isolated spike based on a first area of the histogram in the first region and a second area in the second region.

6. The video processing method of claim 1, wherein said identifying the isolated spike further comprises identifying the isolated spike based on the largest number of pixels for a particular luminance value within the second region and the mean number of pixels for all luminance values within the second region.

7. The video processing method of claim 1, wherein said identifying the isolated spike further comprises identifying the isolated spike based on a first area of the histogram in the first sub-region and a second area of the histogram in the second sub-region.

8. A video processing method comprising:
   generating, via a histogram generating component, a histogram for image data of an image frame;
   analyzing, via an analyzing component, the histogram;
   identifying, via the analyzing component, an isolated spike in the histogram;
   outputting, via the analyzing component, at least one strobe parameter indicating the possibility of a strobe within the image frame;
   comparing, via a comparator, the at least one strobe parameter with at least one predetermined threshold;
   outputting, via the comparator, a first instruction signal when the at least one comparison operation is indicative of a strobe; and
   outputting, via the comparator, a second instruction signal when the at least one comparison operation is not indicative of a strobe;
   wherein either one of said outputting the first instruction signal or outputting the second instruction signal further comprises applying a binary mask to the frame to verify the existence of a strobe.

9. A video processing method comprising:
   generating, via a histogram generating component, a histogram for image data of an image frame;
   analyzing, via an analyzing component, the histogram;
   identifying, via the analyzing component, an isolated spike in the histogram;
   outputting, via the analyzing component, at least one strobe parameter indicating the possibility of a strobe within the image frame; and
   dividing, via an image dividing component, the image data of the image frame into sections of image data corresponding to sections of the image frame, respectively, wherein said analyzing the histogram comprises analyzing each section of image data individually, wherein said identifying the isolated spike in the histogram comprises identifying the isolated spike by analyzing each section of image data individually, wherein said outputting the strobe parameter comprises outputting at least one strobe parameter for each section of image data individually, wherein said comparing comprises comparing each at least one strobe parameter with at least one predetermined threshold, wherein said outputting the first instruction signal comprises outputting a respective first instruction signal when the respective at least one comparison operation is indicative of a strobe, and wherein said outputting the second instruction signal comprises outputting a second respective instruction signal when the respective at least one comparison operation is not indicative of a strobe.

* * * * *